(12) United States Patent
Kawai et al.

(10) Patent No.: US 7,701,351 B2
(45) Date of Patent: Apr. 20, 2010

(54) TAG COMMUNICATION SYSTEM HAVING A CONTROLLED ANTENNA ARRAY TO PREVENT INTERFERENCE

(75) Inventors: Takehiro Kawai, Mukou (JP); Hideyuki Ohara, Kizugawa (JP)

(73) Assignee: Omron Corporation, Kyoto (JP)

( * ) Notice: Subject to any disclaimer, the term of this patent is extended or adjusted under 35 U.S.C. 154(b) by 388 days.

(21) Appl. No.: 11/798,609

(22) Filed: May 15, 2007

(65) Prior Publication Data

US 2007/0262870 A1 Nov. 15, 2007

(30) Foreign Application Priority Data

May 15, 2006 (JP) .............................. 2006-135171

(51) Int. Cl.
*G08B 13/14* (2006.01)

(52) U.S. Cl. ................. 340/572.7; 340/572.1; 340/10.1

(58) Field of Classification Search .............. 340/572.1, 340/572.7, 10.1, 10.2
See application file for complete search history.

(56) References Cited

U.S. PATENT DOCUMENTS

| | | | | |
|---|---|---|---|---|
| 5,519,381 | A | * | 5/1996 | Marsh et al. ................ 340/10.2 |
| 6,750,771 | B1 | * | 6/2004 | Brand ...................... 340/572.7 |
| 7,495,557 | B2 | * | 2/2009 | Fukasawa et al. ........ 340/572.1 |

* cited by examiner

*Primary Examiner*—Jeffery Hofsass
(74) *Attorney, Agent, or Firm*—Dickstein Shapiro LLP

(57) ABSTRACT

The invention provides a tag communication system, an interference preventing method and a tag communication controller suitable for prevention of a radio wave interference able to be caused by radio waves mutually emitted when plural tag communication devices are arranged. Plural reader-writers are oppositely arranged through a belt conveyer for conveying an article. A null of the reader-writer is opposed to a null of the reader-writer. A null of the reader-writer is opposed to a null of the reader-writer. Main lobes are directed to a direction causing no mutual interference.

9 Claims, 8 Drawing Sheets

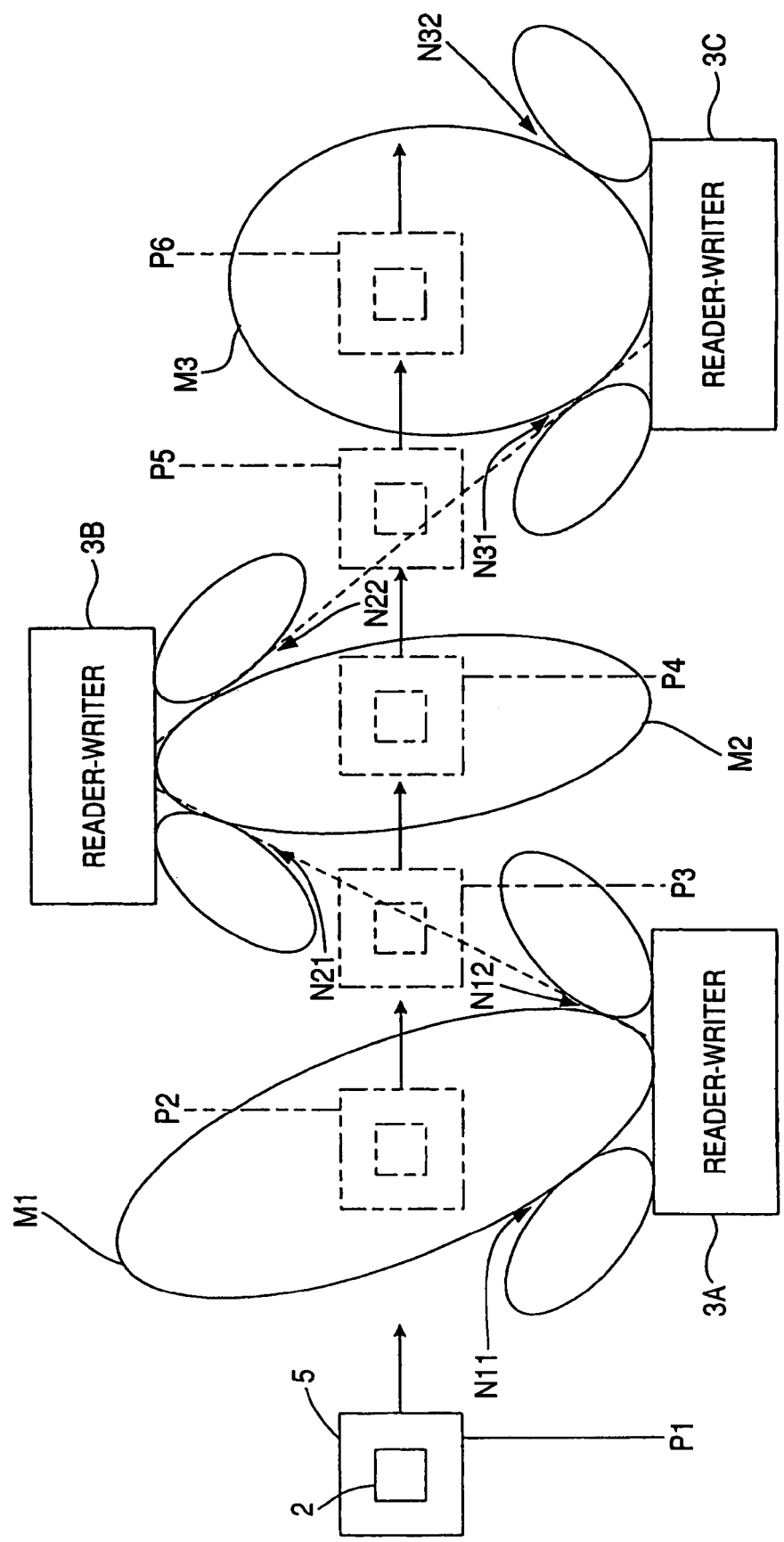

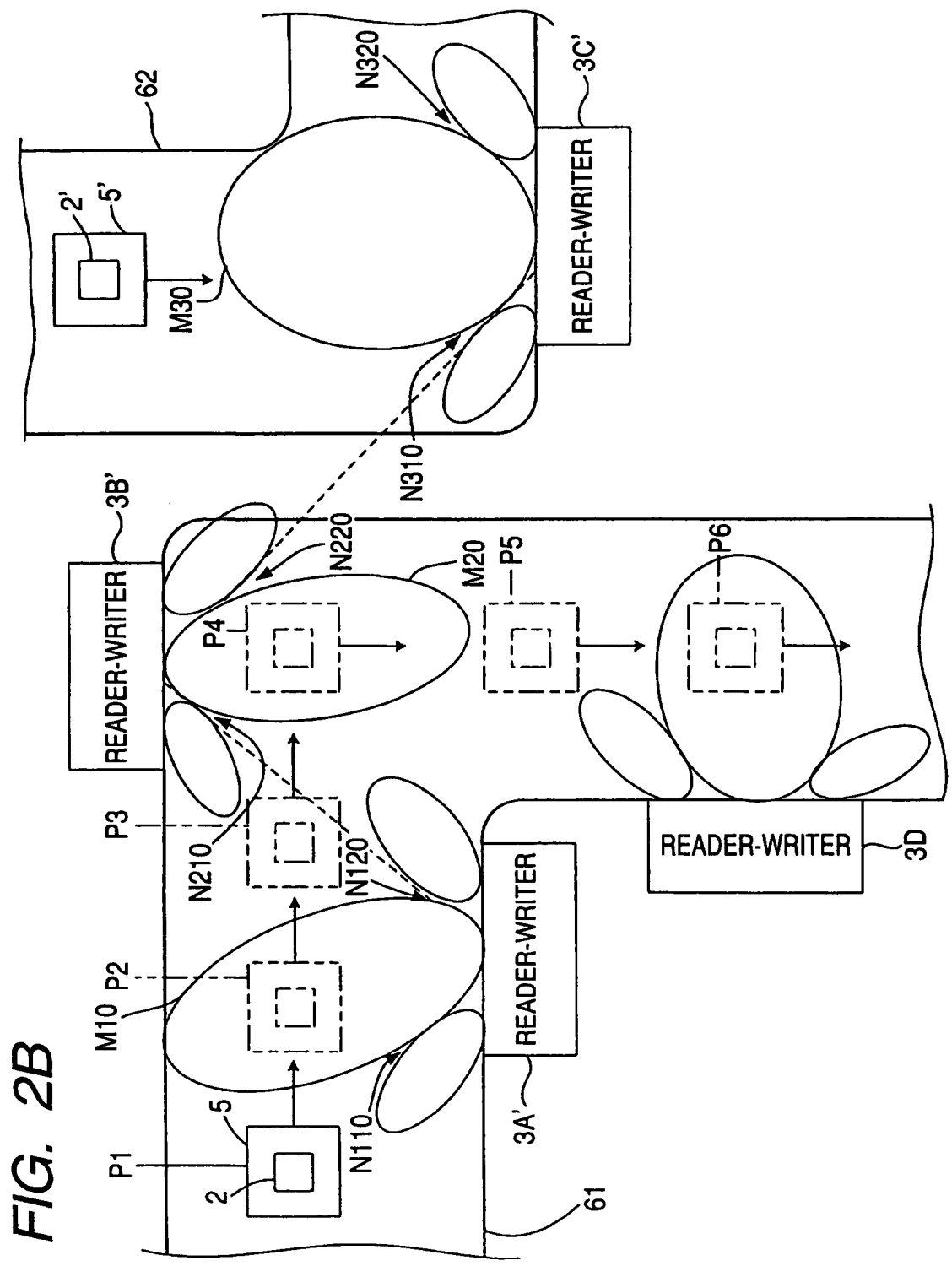

VIEW SHOWING FIRST ARRANGEMENT EXAMPLE OF SHOW CASE

VIEW SHOWING SECOND ARRANGEMENT EXAMPLE OF SHOW CASE

PRIOR ART

TAG COMMUNICATION SYSTEM HAVING A CONTROLLED ANTENNA ARRAY TO PREVENT INTERFERENCE

BACKGROUND OF THE INVENTION

1. Field of the Invention

The present invention relates to a tag communication system, an interference preventing method and a tag communication controller suitable for prevention of a radio wave interference able to be caused by radio waves mutually emitted when plural tag communication devices are arranged.

2. Background Art

When plural reader-writers as tag communication devices are arranged and wireless communication is performed through a RFID tag attached to baggage and an antenna, there is a case in which radio waves mutually emitted interfere and cause an obstacle of the communication. As a method for preventing this interference, there are formerly a method for preventing the interference by synchronizing signal transmission timing of the reader-writer, a method for preventing the interference by adjusting a direction of the antenna and arranging an absorbing body, a method for normalizing a new interference preventing function such as LBT (Listen Before Talk) and DRM (Dens Read Mode), etc.

However, in these methods, there are problems such as a reduction of a system speed due to wiring between the reader-writers and time division communication, arranging cost and a reduction of a freedom degree of the arrangement, a reduction of the system speed due to the time division communication, an increase of a required frequency band.

Therefore, for example, there is a technique disclosed in JP-A-2006-42268 as an interference preventing method replaced with these methods. In the following description, reference numerals within parentheses are described in JP-A-2006-42268. The technique disclosed in this JP-A-2006-42268 reduces an interference from other electronic authenticating devices in an environment for arranging plural electronic authenticating devices. For example, this JP-A-2006-42268 discloses a show case for arranging two element antennas (12a, 12b) as shown in FIGS. 8 and 9 (views corresponding to FIGS. 7 and 8 of JP-A-2006-42268). This JP-A-2006-42268 discloses a method for preventing an interference between reader/writer when the RFID reader/writer constructed from a main body (10), an electricity supply network (11), plural element antennas (12a, 12b) and a personal computer (13) is arranged every show case as shown in FIGS. 8 and 9. Concretely, synthetic directivity of the antenna constructed by two element antennas (12a, 12b) is changed by changing the amplitude and phase of an electricity supply signal given to the element antenna (12a). The interference between the reader/writer is reduced by directing a null in a direction of the show case of a partner side, i.e., by directing a zero point or a low sensitivity portion between lobes of directivity of the antenna.

However, in JP-A-2006-42268, the element antennas (12a, 12b) are arranged within the show case. Accordingly, for example, when an article of commerce is taken in and out, and this element antenna (12a, 12b) comes in contact with a person's hand and is moved and a shift is caused in the directivity of the radio wave, a situation for directing no null to an interference wave is caused. As a result, an interference can be caused. Accordingly, it cannot be said that it is sufficient as the interference preventing method. Further, when the reader-writer used for a purpose except for management of the show case is newly arranged, there is a possibility that a new interference is generated and an obstacle is caused in the system.

SUMMARY OF THE INVENTION

The present invention is made to solve the above problems, and its object is to provide a tag communication system, an interference preventing method and a tag communication controller suitable for prevention of the radio wave interference able to be caused by radio waves mutually emitted when plural tag communication devices are arranged.

To achieve the above object, the present invention resides in a tag communication system comprising plural tag communication devices for performing wireless communication with a RFID tag attached to a moving body through a radio wave, wherein each of the plural tag communication devices is constructed by plural antenna elements and has an array antenna able to form a null of directivity of the antenna and a main lobe; and the null is mutually opposed between one tag communication device and another tag communication device among the plural tag communication devices, and the directivity of each array antenna is controlled so as to direct the main lobe to a direction mutually causing no interference.

Further, the present invention resides in an interference preventing method in plural tag communication devices for performing wireless communication with a RFID tag attached to a moving body through a radio wave, wherein each of the plural tag communication devices is constructed by plural antenna elements and has an array antenna able to form a null of directivity of the antenna and a main lobe; and the null is mutually opposed between one tag communication device and another tag communication device among the plural tag communication devices, and the directivity of each array antenna is controlled so as to direct the main lobe to a direction mutually causing no interference.

Further, the present invention resides in a tag communication controller for controlling the operations of plural tag communication devices for performing wireless communication with a RFID tag attached to a moving body through a radio wave, wherein each of the plural tag communication devices is constructed by plural antenna elements and has an array antenna able to form a null of directivity of the antenna and a main lobe; and the null is mutually opposed between one tag communication device and another tag communication device among the plural tag communication devices, and the directivity of each array antenna is controlled so as to direct the main lobe to a direction mutually causing no interference.

To achieve the above object, the present invention also resides in a tag communication system comprising plural tag communication devices for performing wireless communication with a RFID tag attached to a moving body through a radio wave, and oppositely arranged through a moving path of this moving body, wherein each of the plural tag communication devices is constructed by plural antenna elements and has an array antenna able to form a null of directivity of the antenna and a main lobe; and the null is mutually opposed between one tag communication device and another tag communication device among the plural tag communication devices, and the directivity of each array antenna is controlled so as to direct the main lobe to a direction mutually causing no interference.

Further, the present invention resides in an interference preventing method in plural tag communication devices for performing wireless communication with a RFID tag attached to a moving body through a radio wave, and oppositely arranged through a moving path of this moving body, wherein each of the plural tag communication devices is constructed by plural antenna elements and has an array antenna able to form a null of directivity of the antenna and a main lobe; and the null is mutually opposed between one tag communication device and another tag communication device among the plural tag communication devices, and the directivity of each array antenna is controlled so as to direct the main lobe to a direction mutually causing no interference.

Further, the present invention resides in a tag communication controller for controlling the operations of plural tag communication devices for performing wireless communication with a RFID tag attached to a moving body through a radio wave, and oppositely arranged through a moving path of this moving body, wherein each of the plural tag communication devices is constructed by plural antenna elements and has an array antenna able to form a null of directivity of the antenna and a main lobe; and the null is mutually opposed between one tag communication device and another tag communication device among the plural tag communication devices, and the directivity of each array antenna is controlled so as to direct the main lobe to a direction mutually causing no interference.

The above "moving body" is an object moved by borrowing another force, for example, an article conveyed by a conveying means such as a belt conveyer. In this case, the belt conveyer becomes a moving path. Further, an object moved by its own force, e.g., a human being, an animal, etc. are also included in this "moving body".

Further, for example, the above "RFID tag" includes a RFID tag of a passive type in which an electric power source such as a battery is not arranged and a circuit is operated by electric power transmitted by the radio wave from the reader-writer, and wireless communication with the reader-writer is performed. The above "RFID tag" also includes a RFID tag of an active type having an electric power source such as a battery.

For example, the above "tag communication device" is a reader-writer or a reader and a writer (hereinafter called "a reader-writer, etc.") able to communicate with the RFID tag. Further, a plurality of these reader-writers, etc. are arranged through a distance able to cause an interference by the radio wave emitted by each reader-writer, etc. For example, it includes a case in which one reader-writer is arranged at a distance causing an interference with respect to one reader-writer. Further, it also includes a case in which plural reader-writers are arranged at a distance causing an interference with respect to one reader-writer.

Here, for example, "oppositely arranged through a moving path of a moving body" includes a case for arranging plural reader-writers right in front through the belt conveyer, and a case for arranging the plural reader-writers so as to be shifted leftward and rightward from a right front face.

The above "array antenna" includes a construction for linearly (straight line shape) arraying plural antenna elements and a construction for two-dimensionally arraying the plural antenna elements. Further, the shape of the antenna element may be a circular shape and a square shape, and the antenna element may be also formed by a dipole element and may be also constructed from a patch antenna of a planar shape. When the antenna element is constructed by the patch antenna, radio wave is hardly transmitted in a horizontal face direction of this array antenna. Accordingly, for example, when three or more reader-writers are oppositely arranged along the belt conveyer, the possibility that the radio wave is transmitted to the reader-writer arranged in the horizontal direction becomes low. Accordingly, the possibility of giving an interference becomes low so that it is suitable.

Further, for example, this "array antenna" is constructed from a phased array antenna. A device for changing the phase of the radio wave and called a phase shifter is connected to each antenna element. A direction for most strongly radiating the radio wave can be changed by setting this phase shifter. A portion for most strongly radiating this radio wave is a "main lobe". On the other hand, a direction for radiating no radio wave or low in signal receiving sensitivity is formed in directivity of the antenna, and this becomes a "null". Plural "nulls" can be formed in accordance with the number of antenna elements. For example, if the number of antenna elements is N in the phased array antenna linearly arranged, N−1 nulls can be formed.

As mentioned above, in accordance with the present invention, the null is mutually opposed between one tag communication device and another tag communication device among plural tag communication devices oppositely arranged through the moving path of the moving body. Further, directivity of each array antenna is controlled such that the main lobe is mutually directed to a direction causing no interference. Namely, the nulls are opposed. Accordingly, for example, even when one of opposed tag communication devices is moved by an impact so that the direction of its main lobe is directed to another null, a mutual interference between these tag communication devices can be prevented. Accordingly, it can be said that it is more reliable as an interference preventing measure in comparison with a conventional interference preventing method.

BRIEF DESCRIPTION OF THE DRAWINGS

FIG. 2A is a view showing a state for setting directivity of each reader-writer and preventing a mutual interference seen from above.

FIG. 2B is a view showing the state for setting the directivity of each reader-writer and preventing the mutual interference seen from above.

FIG. 7A shows a case for setting the directivity of the reader-writer 3A, and FIG. 7B shows a case for setting the directivity of the reader-writer 3B.

DESCRIPTION OF THE PREFERRED EMBODIMENTS

A best mode for carrying out the present invention will next be explained with reference to the accompanying drawings.

Figure 1:
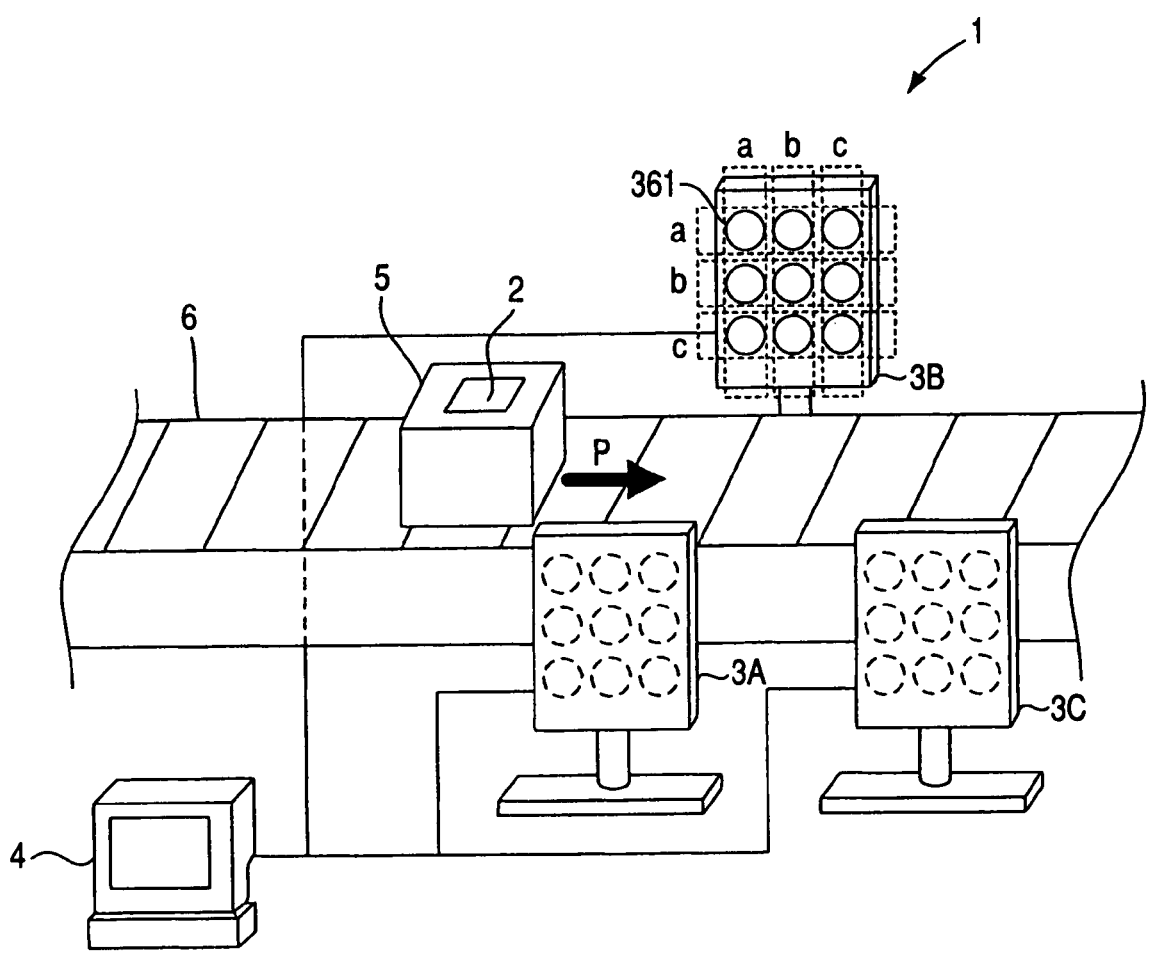
FIG. 1 is an explanatory view showing the summary of a tag communication system of the present invention.

FIG. 1 shows the summary of a RFID communication system applying the present invention thereto. The RFID communication system 1 of this figure manages warehousing and forwarding of many articles 5 (moving bodies) conveyed by a belt conveyer 6. Concretely, a RFID tag 2 is stuck to an article, and three reader-writers (tag communication devices) 3A, 3B, 3C are oppositely arranged through the belt conveyer 6 as a moving path of the article 5. When the article 5 is conveyed on the belt conveyer 6 in the direction of an arrow P, and enters the interior (a main lobe described later) of a reading area of each of the reader-writers 3A, 3B, 3C, each of the reader-writers 3A, 3B, 3C performs wireless communication with the RFID tag 2 and reads and writes data, and thereby manages warehousing and forwarding of the article 5.

Here, as shown in FIG. 1, the reader-writers 3A, 3B, 3C are oppositely arranged through the belt conveyer 6. Accordingly, for example, there is a fear that the reader-writer 3A receives an interference by a transmitted radio wave of the reader-writer 3B. Therefore, in this RFID communication system 1, the directivity of the transmitted radio wave of each of the reader-writers 3A, 3B, 3C is controlled by a controller 4, and the interference between the opposed reader-writers 3A, 3B, 3C is prevented.

FIG. 2A shows a state for setting the directivity of these reader-writers 3A, 3B, 3C, and preventing the mutual interference. In this figure, M1, M2, M3 are main lobes, and N11, N12, N21, N22, N31, N32 are nulls. The controller 4 as the tag communication controller controls the directivity such that the main lobes M1, M2, M3 of the respective reader-writers 3A, 3B, 3C are not overlapped with each other. Simultaneously, the controller 4 adjusts the direction of the null so as to oppose the null N12 of the reader-writer 3A and the null N21 of the reader-writer 3B, and oppose the null N22 of the reader-writer 3B and the null N31 of the reader-writer 3C. Namely, in the RFID communication system 1, the controller 4 controls the directivity of each of the reader-writers 3A, 3B, 3C such that the directions of the main lobes M1, M2, M3 of the respective reader-writers 3A, 3B, 3C are directed to directions mutually causing no interference, and the mutual nulls are opposed between the opposed reader-writers. Its details will be described later.

Next, with reference to FIGS. 3 to 5, the constructions of the RFID tag 2, the reader-writer 3 and the controller 4 will be explained.

Figure 3:
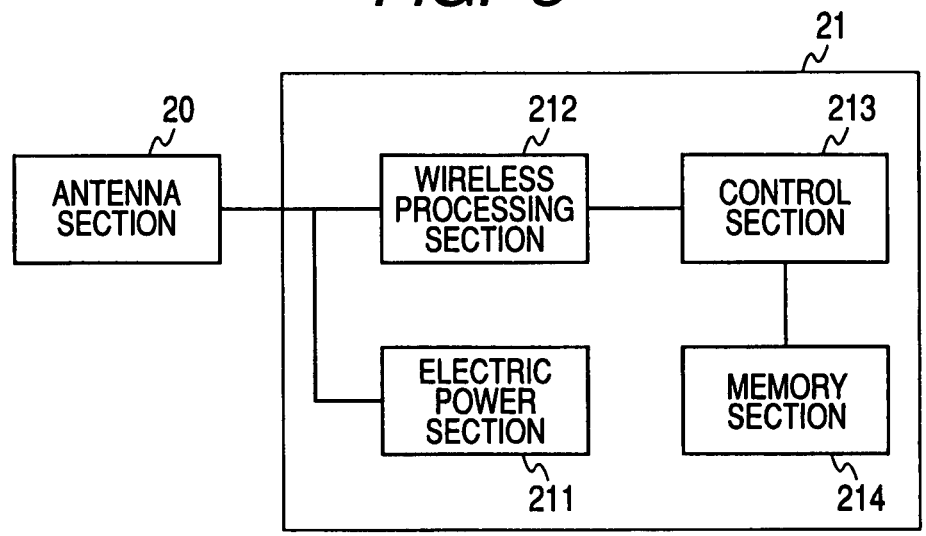
FIG. 3 is a block diagram showing the schematic construction of a RFID tag.

FIG. 3 is a block diagram showing the schematic construction of the RFID tag 2. As shown in FIG. 3, the RFID tag 2 is constructed by arranging an antenna section 20 and a wireless communication IC 21. For example, the above passive type and an active type are used as the RFID tag 2 of this kind.

The antenna section 20 receives the radio wave from the reader-writer 3 as an electric power source for operating the wireless communication IC 21. Further, the antenna section 20 converts the radio wave received from the reader-writer 3 into a wireless signal, and transmits the wireless signal to the wireless communication IC 21. Further, the antenna section 20 converts the wireless signal from the wireless communication IC 21 into a radio wave, and transmits this radio wave to the reader-writer 3. An antenna, a resonant circuit, etc. are used in the antenna section 20.

The wireless communication IC 21 stores data from the reader-writer 3 and transmits the stored data to the reader-writer 3 through the antenna section 20 on the basis of a signal received from the reader-writer 3 through the antenna section 20. As shown in FIG. 2A, this wireless communication IC 21 is constructed by arranging an electric power section 211, a wireless processing section 212, a control section 213 and a memory section 214.

The electric power section 211 rectifies an induction voltage generated by receiving a radio wave by the antenna section 20 by a rectifying circuit. After the induction voltage is adjusted to a predetermined voltage by an electric power circuit, the electric power section 211 supplies this voltage to each section of the wireless communication IC 21. A bridge diode, a capacitor for a voltage adjustment, etc. are used in the electric power section 211.

The wireless processing section 212 converts a wireless signal received from the exterior through the antenna section 20 into an original form, and transmits converted data to the control section 213. Further, the wireless processing section 212 converts data received from the control section 213 into a form suitable for wireless transmission, and transmits the converted wireless signal to the exterior through the antenna section 20. An A/D (Analog to Digital) converting circuit, a D/A (Digital to Analog) converting circuit, a modulating-demodulating circuit, an RF circuit, etc. are used in the wireless processing section 212.

The control section 213 generally controls the operations of the above various kinds of constructions within the wireless communication IC 21. The control section 213 has a logic arithmetic circuit, a register, etc., and functions as a computer. The operations of the various kinds of constructions are controlled by executing a control program by a computer. For example, this program may be also a mode in which a program installed to ROM (Read Only Memory), etc. of the memory section 214 is read and used. This program may be also a mode in which the above program is downloaded from the reader-writer 3 through the antenna section 20 and the wireless processing section 212, and is installed to the memory section 214 and is executed.

In particular, the control section 213 stores data from the reader-writer 3 to the memory section 214 and reads out the data stored to the memory section 214 on the basis of data received from the reader-writer 3 through the antenna section 20 and the wireless processing section 212. The control section 213 then transmits these data to the reader-writer 3 through the wireless processing section 212 and the antenna section 20.

The memory section 214 is constructed by a semiconductor memory such as the above ROM, SRAM (Static RAM), FeRAM (ferroelectric memory). The above control program, various kinds of other programs, and various kinds of data are enumerated as contents stored to this memory section 214. In the wireless communication IC 21, the radio wave transmitted from the reader-writer 3 is set to an electric power source. Therefore, it is desirable to use a nonvolatile memory such as ROM, a memory such as SRAM, FeRAM having small consumption electric power.

Figure 4:
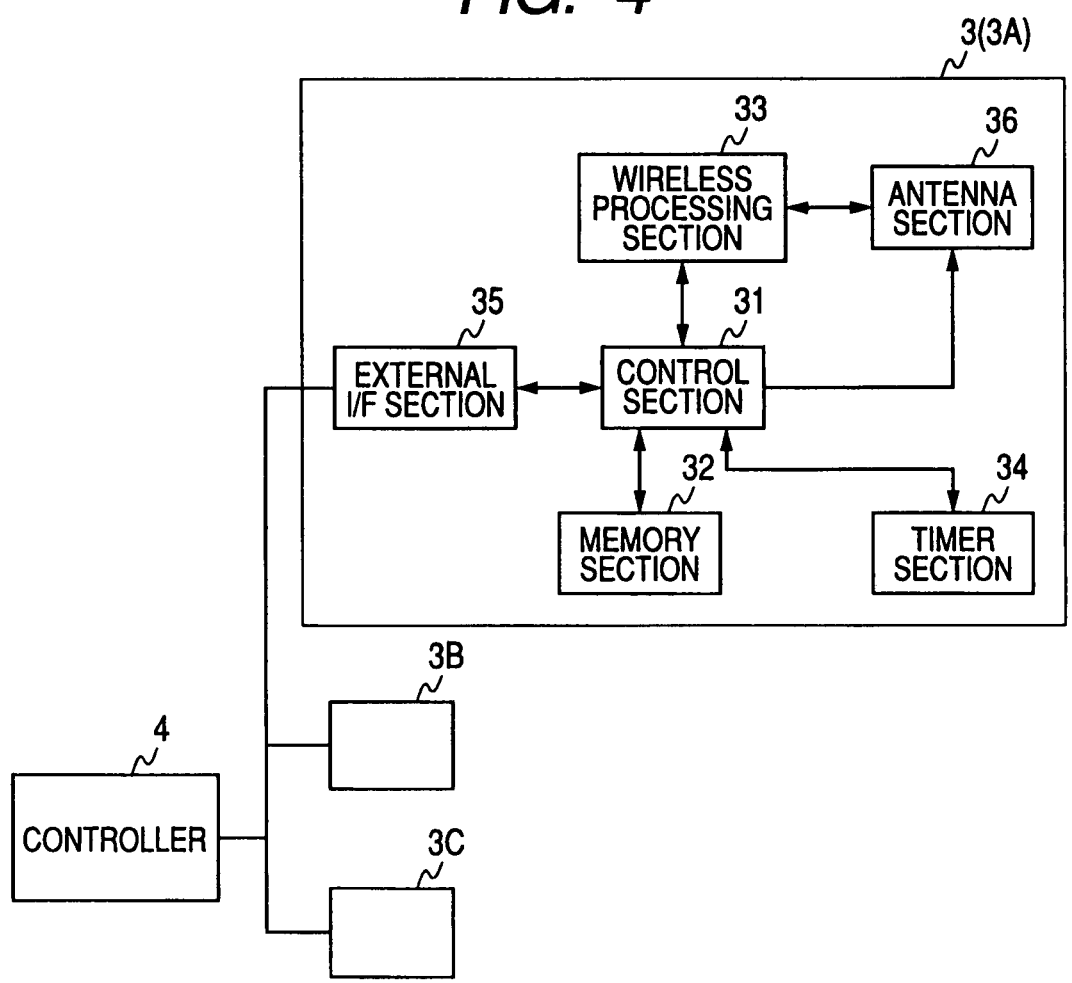
FIG. 4 is a block diagram showing the schematic construction of the reader-writer 3 and a connecting mode of this reader-writer and a controller.

FIG. 4 is a block diagram showing the schematic construction of the reader-writer 3 and a connecting mode of the reader-writers 3A, 3B, 3C and the controller 4. This figure shows only the block diagram showing the schematic construction of the reader-writer 3A among the three reader-writers 3A, 3B, 3C. However, the reader-writers 3A, 3B, 3C have the same construction. Accordingly, the reader-writer 3A will next be typically explained as the reader-writer 3 with respect to its construction. In this embodiment mode, it is explained as the reader-writer, but only a reader and only a writer may be also used.

The reader-writer 3 has a control section 31, a memory section 32, a wireless processing section 33, a timer section 34, an external I/F section 35 and an antenna section 36.

The control section 31 generally controls the operation of each of the above constructions within the reader-writer 3. For example, the control section 31 is constructed by a computer of a PC (Personal Computer) base, and the operations of various kinds of constructions are controlled by executing a control program by a computer. For example, this program may be also a mode in which a program recorded to removable media such as CD-ROM is read and used. This program may be also a mode in which a program installed to a hard disk, etc. is read and used. Further, a mode in which the above program is downloaded through the external I/F section 35 and is installed to a hard disk, etc. and is executed, etc. are also considered.

The memory section 32 is constructed by a nonvolatile memory device such as the above hard disk. The above control program, an OS (Operation System) program, and various kinds of other data are enumerated as contents stored to this memory section 32. In this embodiment mode, a scan range of an antenna in the antenna section 36, a pitch angle, and data of a holding time are stored to the memory section 32.

Further, a non-directional setting program for setting the antenna section 36 of each of the reader-writers 3A, 3B, 3C to a non-directional property in accordance with commands transmitted from the controller 4, and a directional setting program for scanning the antenna section 36 are stored to this memory section 32.

The wireless processing section 33 modulates a carrier wave by data received from the control section 31 and generates a wireless signal. This wireless signal is transmitted to the exterior through the antenna section 36, and the wireless signal received from the exterior through the antenna section 36 is converted into an original form, and converted data are transmitted to the control section 31. An A/D converting circuit, a D/A converting circuit, a modulating-demodulating circuit, an RF circuit, etc. are used in the wireless processing section 33.

The timer section 34 measures various kinds of times and transmits measured time data to the control section 31 on the basis of instructions from the control section 31. For example, when the phase of the antenna section 36 described later is sequentially changed, the timer section 34 is used to measure a transmission time of the radio wave at each phase time.

The external I/F section 35 communicates with the controller 4. USB (Universal Serial Bus), IEE1394, Ethernet®, etc. are enumerated as an interface standard of the external I/F section 35.

The antenna section 36 converts the wireless signal from the wireless processing section 33 into a radio wave, and transmits the radio wave to the exterior. Further, the antenna section 36 converts the radio wave received from the exterior into a wireless signal and transmits the wireless signal to the wireless processing section 33. An antenna, a resonant circuit, etc. are used in the antenna section 36. In this embodiment mode, the antenna section 36 is a phased array antenna able to scan a beam direction of the radio wave transmitted to the exterior. Here, as shown in FIG. 1, this antenna section 36 is constructed from the phased array antenna in which antenna elements 361 are two-dimensionally arrayed in 3 rows×3 columns. The beam direction can be scanned by changing the phase of the radio wave in each antenna element 361. The shape of this antenna element 361 may be a circular shape and a square shape, and a dipole element, etc. can be also applied. However, when a patch antenna of a planar shape is used, radio wave is hardly transmitted in a horizontal face direction (a face direction parallel to a radio wave transmitting face of the patch antenna). Accordingly, in this embodiment mode, the patch antenna is used. For example, as shown in FIG. 1, adjacent reader-writer 3C hardly receives an interference by the radio wave transmitted by the reader-writer A. Accordingly, the interference can be prevented beforehand.

Thus, when the antenna element 361 of the phased array antenna is two-dimensionally arrayed, the beam can be transmitted so as to draw a circle with respect to a perpendicular face of a floor. Further, if it is set to the two-dimensional array in this way, a height for transmitting the beam can be changed. For example, it is also possible to adopt a method in which electricity is supplied to only row a of the antenna element 361 when the height of baggage 5 on the belt conveyer 6 shown in FIG. 1 is high, and electricity is supplied to only row c when this height is low.

In the following description, the explanation is made on the premise that electricity is supplied to only three elements of row b of the antenna element 361 shown in FIG. 1, and directivity is set. However, the present invention is not limited to this case.

Here, a method of scan of the beam direction in the phased array antenna will be explained with reference to FIG. 5.

Figure 5:
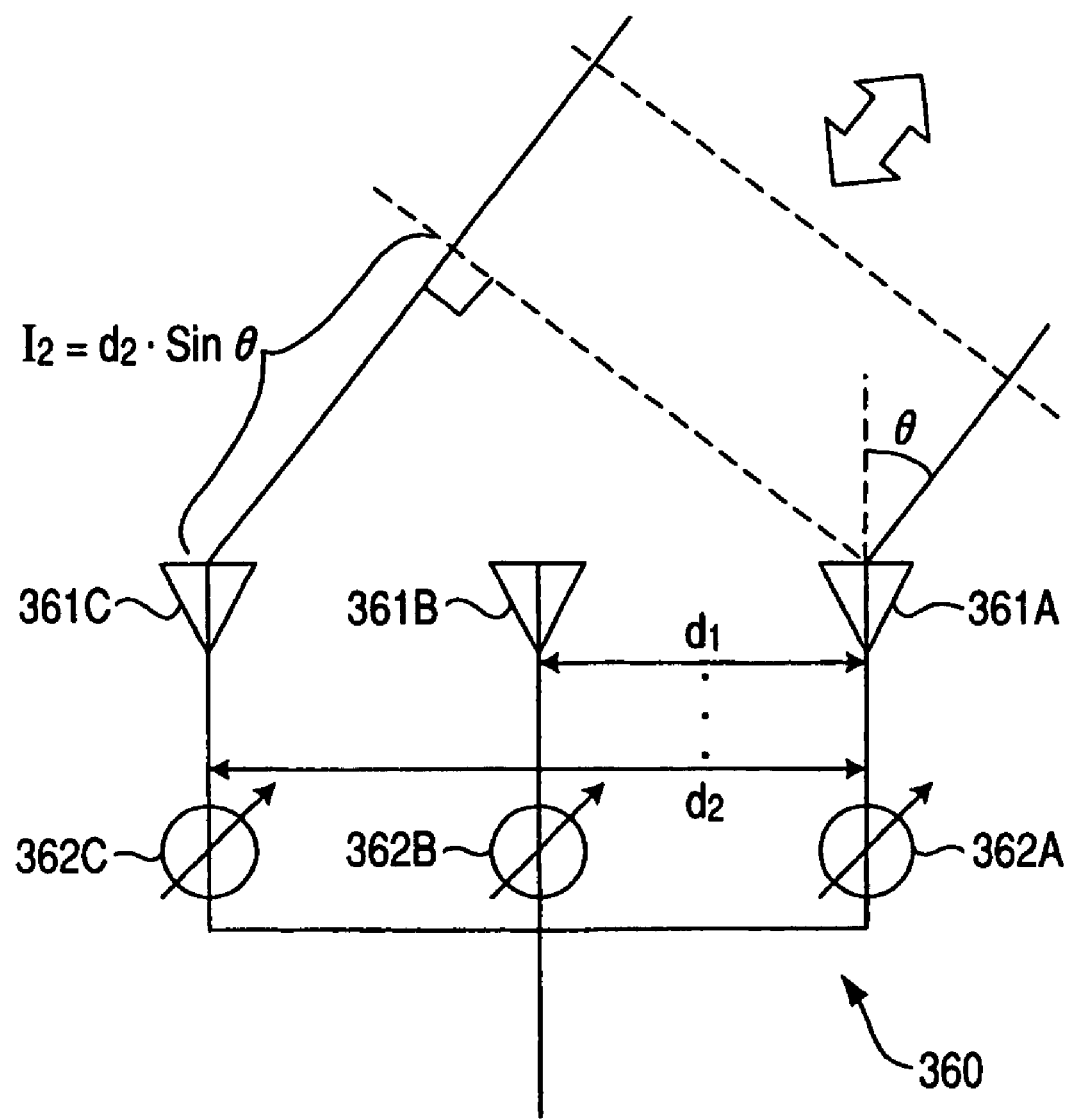
FIG. 5 is a schematic constructional view for explaining a setting method of directivity in an antenna section of the reader-writer.

As shown in FIG. 5, the phased array antenna 360 of this embodiment mode has a structure in which three antenna elements 361A, 361B, 361C are arrayed and phase shifters 362A, 362B, 362C are connected one by one correspondingly to the respective antenna elements. Further, in this phased array antenna 360, the beam of the radio wave, i.e., a main lobe can be directed in the direction of an object by shifting the phase of the radio wave transmitted by each of the antenna elements 361A, 361B, 361C by a predetermined amount by the phase shifters 362A, 362B, 362C, and its directivity is changed. Further, when the direction of this main lobe is changed, a null, i.e., a zero point between lobes of the directivity of the antenna, or the direction of a low sensitivity portion is also changed.

For example, when all the antenna elements 361A, 361B, 361C transmit the radio wave in the same phase, the radio wave radiated from the phased array antenna 360 is propagated as a plane wave of a direction perpendicular to an array direction of the above antenna elements 361A, 361B, 361C. The phase of the radio wave transmitted by each of the antenna elements 361A, 361B, 361C is shifted so as to satisfy the following formula to incline a propagating direction of the radio wave perpendicular to the array direction of this antenna element by an angle θ(rad) as shown in FIG. 5.

As shown in FIG. 5, the wavelength of the transmitted or received radio wave is set to λ(m), and the distance between the antenna element 361A as a reference and the second antenna element 361C is set to $d_2$ (m). The distance between an equal phase face passing the antenna element 361A as a reference among equal phase faces shown by a broken line in FIG. 5, and the second antenna element 361C is set to $l_2$ (m). In this case, a shift $\phi_2$ of the phase of the second antenna element 361C with respect to the phase of the antenna element 361A as a reference is provided by the following formula.

$$\phi = (l_2/\lambda) \times 2\pi = (d_2 \times \sin\theta/\lambda) \times 2\pi \qquad \text{[Formula]}$$

Thus, in the phased array antenna 360, the main lobe can be directed to the direction of an object by shifting the phase of a signal by each of the phase shifters 362A, 362B, 362C so as to satisfy the above formula. On the other hand, when the radio wave is received, the direction of the received radio wave can be distinguished by detecting the shift of the phase of each of the antenna elements 361A, 361B, 361C.

Further, in this embodiment mode, when the direction of the main lobe is changed as mentioned above and the magnitude of electric power of the received radio wave is small or zero, the null is directed with respect to the radio wave (interference wave) transmitted by another reader-writer as described later.

The controller 4 transmits commands to each of the reader-writers 3A, 3B, 3C, and controls the directivity of the radio wave transmitted from each antenna section 36 so as not to cause an interference between the respective reader-writers 3A, 3B, 3C. Further, position information of each of the reader-writers 3A, 3B, 3C is stored to this controller 4 in advance, and the commands are transmitted to each of the reader-writers 3A, 3B, 3C on the basis of this position information. For example, in this embodiment mode, as mentioned above, the antenna section 36 of each of the reader-writers 3A, 3B, 3C is constructed from the phased array antenna for arraying the patch antenna of a planar shape. Accordingly, radio wave is hardly transmitted in the array direction of the antenna. Accordingly, when the directivity of the reader-writer 3A is set in FIG. 1, non-directional setting with respect to the reader-writer 3C described later can be omitted. Namely, when the directivity of the reader-writer 3A is set, electricity supply to the antenna section 36 of the reader-writer 3C can be omitted.

Next, directivity control of each of the reader-writers 3A, 3B, 3C in the controller 4 will be explained with reference to FIGS. 6 and 7.

Figure 6:
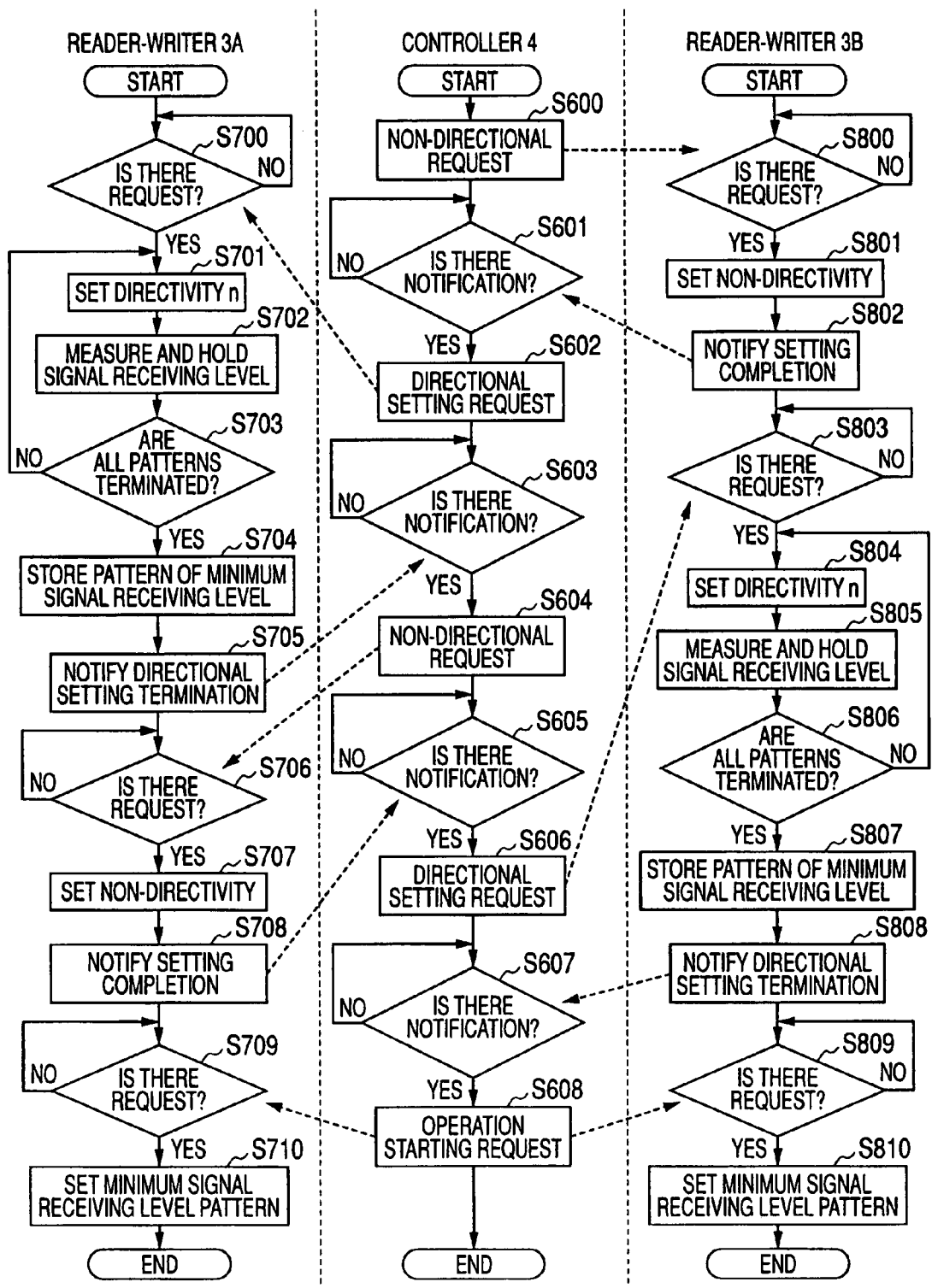
FIG. 6 is a flow chart showing a directivity setting method of reader-writers 3A, 3B.
Figure 7A:
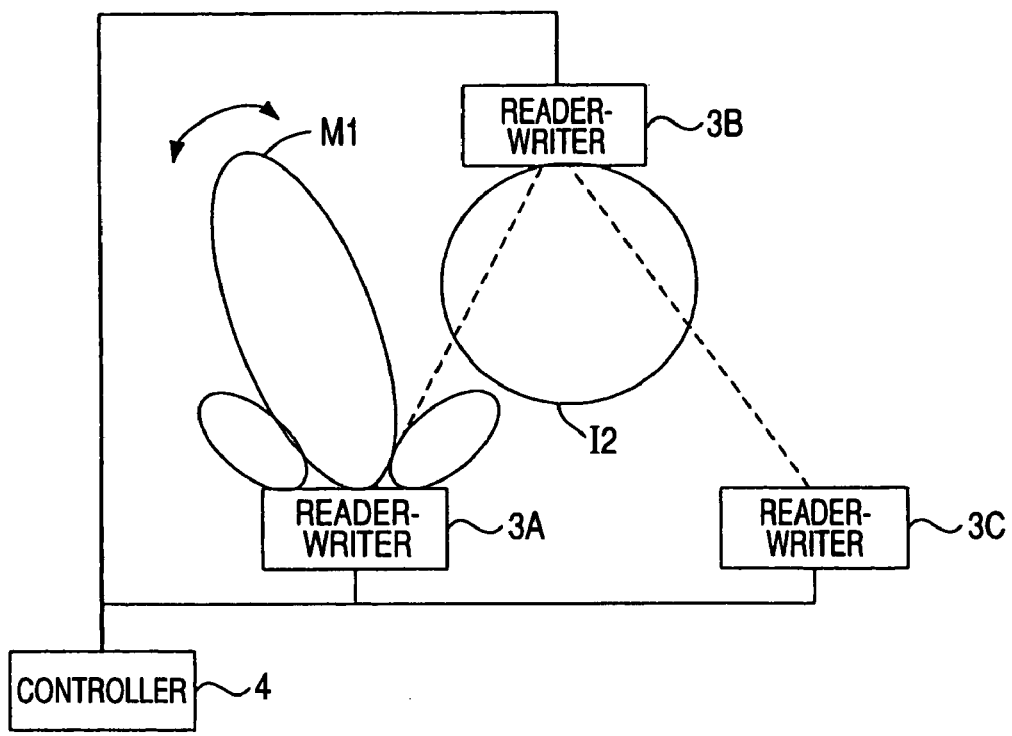
FIGS. 7A and 7B are explanatory views for imitating the directivity setting method of the reader-writer, where
Figure 7B:
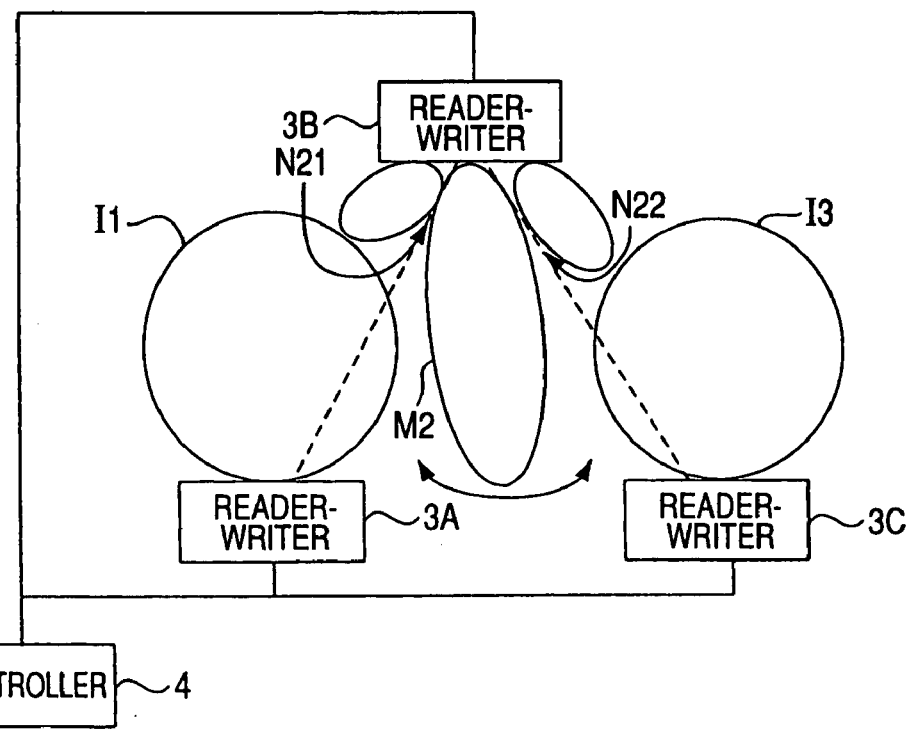
Figure 8:
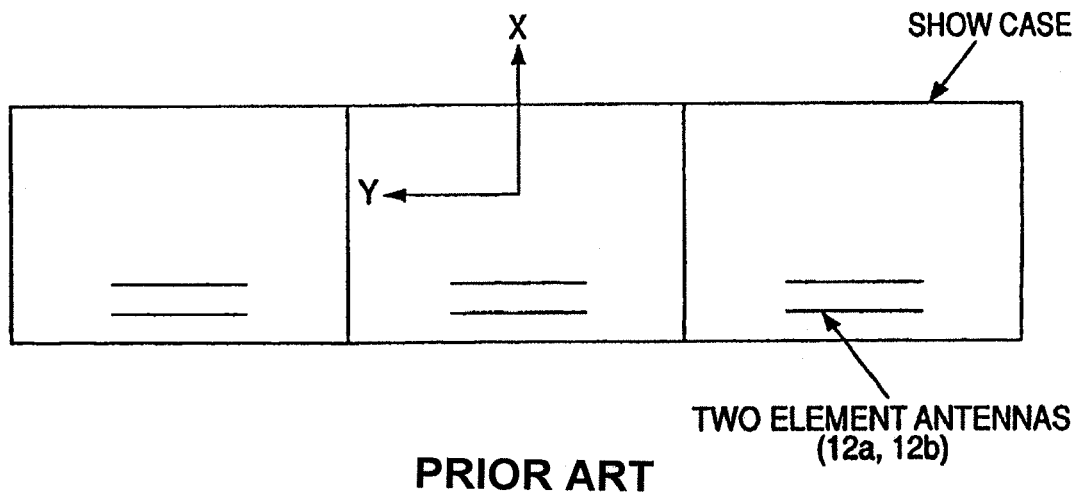
FIG. 8 is a view showing a first arrangement example of a show case described in JP-A-2006-42268.
Figure 9:
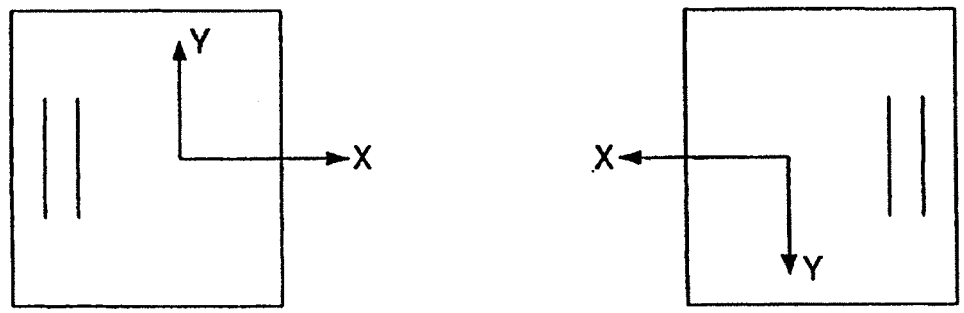
FIG. 9 is a view showing a second arrangement example of the show case described in JP-A-2006-42268.

Here, after the reader-writer 3A and the reader-writer 3B are arranged, directivity is set so as to oppose the respective nulls under control of the controller 4 as shown in FIG. 6, and a mutual interference is prevented. FIG. 6 is a flow chart showing a directivity setting method of the reader-writers 3A, 3B. FIGS. 7A and 7B are explanatory views for imitating this directivity setting method. FIG. 6 describes flow charts respectively showing processing in the reader-writer 3A, processing in the controller 4 and processing in the reader-writer 3B from the left-hand side in this figure. Each processing is executed in parallel, but these processings are advanced while these processings are mutually related since commands, messages, etc. are mutually given and taken.

Accordingly, in the following description, processing until the directivity of each of the reader-writers 3A, 3B is set under control of the controller 4, and the operation of the RFID communication system 1 is started will be explained by including these mutual relations.

Concretely, first, as shown in FIG. 6, a command of a non-directional request is transmitted from the controller 4 to the reader-writer 3B (S600). On the other hand, the reader-writer 3B waits until this command is transmitted (N of S800). When this command is transmitted from the controller 4 (Y of S800), non-directivity of the antenna section 36 is set (S801). When non-directivity is completely set, the completion of the non-directivity setting is notified to the controller 4 (S802). Here, the non-directivity means that no directivity is set in the antenna section 36, and also means that the reader-writer 3B is set to non-directivity by supplying electricity to e.g., only row b and column b (a central portion of the antenna element of the reader-writer 3B shown in FIG. 1) of the antenna element 341 of the reader-writer 3B. FIG. 7A shows a state of the radio wave transmitted from the reader-writer 3B of this case, and a non-directional wave 12 is transmitted from the reader-writer 3B.

On the other hand, the controller 4 waits until completion of this non-directional setting is notified after the command of the above non-directional request is transmitted (N of S601). When there is this notification (Y of S601), a command of a directional setting request is transmitted to the reader-writer 3A (S602).

In contrast to this, the reader-writer 3A side waits until the command of this directional setting request is transmitted from the controller 4 (N of S700). When this command is transmitted (Y of S700), the phases of phase shifters 342A, 342B, 342C are changed in a predetermined range set in advance, and a signal receiving level of the radio wave at that time is measured and held (S701, S702). For example, the phase is changed from 0° to 180° every 10°. Namely, the beam direction of the radio wave transmitted from the reader-writer 3A is scanned (setting of directivity n), and the signal receiving level of each phase in all patterns of 0° to 180° such as the signal receiving level at the time of 10°, and the signal receiving level at the time of 20° is temporarily stored to the memory section 32 every each phase. This pattern is not limited to the above case, but can be suitably changed by a user. The state of scan in this reader-writer 3A is shown in FIG. 7A, and the signal receiving level at that time is measured by performing the scan in the direction of an arrow.

When all the above patterns are terminated (Y of S703), the pattern of a minimum signal receiving level is stored from all these patterns (S704), and notification of directional setting termination is transmitted to the controller 4 (S705). On the other hand, the controller 4 side waits until this notification is transmitted from the reader-writer 3A after a command of the above directional setting request is transmitted (N of S603). When this notification is received, (Y of S603), it proceeds to directional setting processing of the reader-writer 3B side of the next process.

Namely, the controller 4 performs processing similar to the directional setting processing of the above reader-writer 3A, and also performs the directional setting processing of the reader-writer 3B side of the next process. Thereafter, the controller 4 sets a minimum signal receiving level pattern stored to each of the reader-writers 3A, 3B, and starts an operation.

Concretely, when the directional setting processing of the above reader-writer 3A is terminated, as shown in FIG. 6, a command of a non-directional request is next transmitted to the reader-writer 3A in the controller 4 (S604). On the other hand, the reader-writer 3A waits until this command is transmitted (N of S706). When this command is transmitted from the controller 4 (Y of S706), non-directivity of the antenna section 36 is set (S707). When the setting of the non-directivity is completed, the completion of the non-directional setting is notified to the controller 4 (S708). This non-directivity is set similarly to the above case.

On the other hand, the controller 4 waits until the completion of this non-directional setting is notified after the command of the above non-directional request is transmitted (N of S605). When there is this notification (Y of S605), a command of a directional setting request is transmitted to the reader-writer 3B (S606).

In contrast to this, the reader-writer 3B side performs processings similar to the above S700 to S704 (S803 to S807), and the notification of directional setting termination is then transmitted to the controller 4 (S808). On the other hand, the controller 4 side waits until this notification is transmitted from the reader-writer 3B after the command of the above directional setting request is transmitted (N of S607). When this notification is received (Y of S607), a command of an operation starting request is transmitted to each of the reader-writers 3A, 3B (S608). On the other hand, each of the reader-writers 3A, 3B waits until the command of this operation starting request is transmitted (N of S709, N of S809). When the request of this command is respectively received (Y of S709, Y of S809), each stored minimum signal receiving level pattern is set (S710, S810), and the operation of the tag communication system 1 is started. Namely, communication of the reader-writers 3A, 3B, 3C and the RFID tag 2 is started.

In the above explanation, the number of reader-writers of an interference source is set to one between two reader-writers 3A, 3B, i.e., in one reader-writer, but the number of reader-writers of the interference source may be also plural.

For example, as shown in FIG. 7B, when two reader-writers constructed by the reader-writers 3A, 3C become the interference source with respect to the reader-writer 3B, reader-writers for setting non-directivity are set to two reader-writers 3A, 3C in the directional setting processing of the reader-writer 3B, and the directional setting processing shown in the above FIGS. 7A and 7B is performed. In this case, as shown in FIG. 7B, the radio wave transmitted from the reader-writer 3A and the reader-writer 3C is set as in a non-directional wave I1 and a non-directional wave I3. Similar to the above case, the antenna section 36 of the reader-writer 3B is scanned and the minimum signal receiving level is measured and stored.

When the directivity of each of the reader-writers 3A, 3B, 3C is set as mentioned above, its main lobe and the direction of a null attain a state as shown in FIG. 2A. Namely, as a result, a null N12 of the reader-writer 3A and a null N21 of the reader-writer 3B are opposed, and a null N22 of the reader-writer 3B and a null N31 of the reader-writer 3C are opposed. Further, the main lobes M1, M2, M3 of the respective reader-writers 3A, 3B, 3C attain a state directed to a direction causing no mutual interference.

When the belt conveyer 6 is operated and an operation is started, the article 5 sticking the RFID tag 2 thereto is sequentially conveyed on the belt conveyer 6 from position P1 of the illustrated left-hand side to position P6 of the illustrated right-hand side. In this case, the RFID tag 2 can be respectively read or written in the reader-writer 3A in position P2, and the reader-writer 3B in position P4, and the reader-writer 3C in position P6. On the other hand, in position P3 and position P5, each of the reader-writers 3A, 3B, 3C cannot read and write the RFID tag 2.

Namely, while the article 5 is moved between (hereinafter called "a first read-write disable area") between the main lobe M1 and the main lobe M2, or is moved between the main lobe M2 and the main lobe M3 (hereinafter called "a second read-write disable area"), each of the reader-writers 3A, 3B, 3C cannot read and write the RFID tag 2. In this embodiment mode, the state of the RFID tag 2 is transited as in main lobe M1→first read-write disable area→main lobe M2→second read-write disable area→main lobe M3.

Accordingly, for example, even when the reader-writer 3A is moved by an impact and the direction of the main lobe 3A is directed to the direction of the null N21, this first non-radio wave area R1 is secured in this embodiment mode. Accordingly, no mutual interference is caused between the reader-writer 3A and the reader-writer 3B. Accordingly, it can be said that it is more reliable as an interference preventing measure in comparison with a conventional interference preventing method.

Further, in the above embodiment mode, as shown in FIG. 2A, the explanation is made with respect to interference prevention when the reader-writer 3 is oppositely arranged through the belt conveyer 6. However, FIG. 2B shows another embodiment mode.

This FIG. 2B shows a case in which articles 5, 5' are respectively conveyed on two separated belt conveyers 61, 62. In this case, after the article 5 is straightly advanced until positions P1 to P4 on the belt conveyer 61, the article 5 is curved and conveyed in positions P5, P6, and the RFID tag 2 is read and written in an order of reader-writers 3A', 3B', 3D. On the other hand, the article 5' is conveyed on the belt conveyer 62 arranged separately from this belt conveyer 61, and the RFID tag 2' is read and written by the reader-writer 3C'.

In this embodiment mode, the reader-writer 3B' is arranged along the belt conveyer 61 and the reader-writer 3C' is arranged along the belt conveyer 62. The reader-writer 3B' and the reader-writer 3C' are not arranged along the same belt conveyer, but their arranging distances are close. Therefore, an interference of the radio waves can be mutually caused.

Therefore, in this embodiment mode, a null N220 of the reader-writer 3B' and a null N310 of the reader-writer 3C' are opposed by a method similar to that of the embodiment mode shown in FIG. 2A. Further, directivity of the radio wave of each of reader-writers 3B', 3C' is set such that each of main lobes M20, M30 is directed to a direction causing no mutual interference.

In the embodiment mode shown in FIG. 2B, a null N120 and a null N210 are opposed between reader-writers 3A', 3B' oppositely arranged along the belt conveyer 61. The directivity of the radio wave is set such that main lobes M10, M20 are directed to a direction causing no mutual interference.

The interference of the radio wave between the reader-writers arranged in the same belt conveyer can be prevented by setting the directivity of the radio wave of each reader-writer in this way. Further, it is also possible to prevent the interference of the radio wave between the reader-writers arranged in other belt conveyers.

What is claimed is:

1. A tag communication system comprising plural tag communication devices for performing wireless communication with a RFID tag attached to a moving body through a radio wave,
   wherein each of said plural tag communication devices is constructed by plural antenna elements and has an array antenna able to form a null of directivity of the antenna and a main lobe; and
   said null is mutually opposed between one tag communication device and another tag communication device among said plural tag communication devices, and the directivity of each array antenna is controlled so as to direct said main lobe to a direction mutually causing no interference.

2. A tag communication system comprising plural tag communication devices for performing wireless communication with a RFID tag attached to a moving body through a radio wave, and oppositely arranged through a moving path of this moving body,
   wherein each of said plural tag communication devices is constructed by plural antenna elements and has an array antenna able to form a null of directivity of the antenna and a main lobe; and
   said null is mutually opposed between one tag communication device and another tag communication device among said plural tag communication devices, and the directivity of each array antenna is controlled so as to direct said main lobe to a direction mutually causing no interference.

3. The tag communication system according to claim 1 or 2, wherein said antenna element is constructed by a patch antenna.

4. An interference preventing method in plural tag communication devices for performing wireless communication with a RFID tag attached to a moving body through a radio wave, wherein each of said plural tag communication devices is constructed by plural antenna elements and has an array antenna able to form a null of directivity of the antenna and a main lobe; and said null is mutually opposed between one tag communication device and another tag communication device among said plural tag communication devices, and the directivity of each array antenna is controlled so as to direct said main lobe to a direction mutually causing no interference.

5. An interference preventing method in plural tag communication devices for performing wireless communication with a RFID tag attached to a moving body through a radio wave, and oppositely arranged through a moving path of this moving body, wherein each of said plural tag communication devices is constructed by plural antenna elements and has an array antenna able to form a null of directivity of the antenna and a main lobe; and said null is mutually opposed between one tag communication device and another tag communication device among said plural tag communication devices, and the directivity of each array antenna is controlled so as to direct said main lobe to a direction mutually causing no interference.

6. The interference preventing method according to claim 4 or 5, wherein said antenna element is constructed by a patch antenna.

7. A tag communication controller for controlling the operations of plural tag communication devices for performing wireless communication with a RFID tag attached to a moving body through a radio wave, wherein each of said plural tag communication devices is constructed by plural antenna elements and has an array antenna able to form a null of directivity of the antenna and a main lobe; and said null is mutually opposed between one tag communication device and another tag communication device among said plural tag communication devices, and the directivity of each array antenna is controlled so as to direct said main lobe to a direction mutually causing no interference.

8. A tag communication controller for controlling the operations of plural tag communication devices for performing wireless communication with a RFID tag attached to a moving body through a radio wave, and oppositely arranged through a moving path of this moving body, wherein each of said plural tag communication devices is constructed by plural antenna elements and has an array antenna able to form a null of directivity of the antenna and a main lobe; and said null is mutually opposed between one tag communication device and another tag communication device among said plural tag communication devices, and the directivity of each array antenna is controlled so as to direct said main lobe to a direction mutually causing no interference.

9. The tag communication controller according to claim 7 or 8, wherein said antenna element is constructed by a patch antenna.

* * * * *